United States Patent

[11] 3,559,829

| [72] | Inventor | John Wallace Shamel |
| | | 4642 Fornan, North Hollywood, Calif. 91602 |
| [21] | Appl. No. | 790,396 |
| [22] | Filed | Jan. 10, 1969 |
| [45] | Patented | Feb. 2, 1971 |

[54] SPARE TIRE HOLDER
3 Claims, 6 Drawing Figs.

[52] U.S. Cl. .................................................. 214/454, 224/42.21
[51] Int. Cl. .................................................. B62d 43/04
[50] Field of Search .................................................. 214/454, 451, 452, 453, 83.24; 224/42.21, 42.22, 42.12

[56] References Cited
UNITED STATES PATENTS

| 1,176,894 | 3/1916 | Hastings et al. | 214/451X |
| 2,091,071 | 8/1937 | Girl | 214/454 |
| 2,792,137 | 5/1957 | Solomon et al. | 214/83.24 |

Primary Examiner—Hugo O. Schulz
Attorney—Lyon & Lyon

ABSTRACT: A spare tire holder which places the tire above the cargo space in the trunk of a vehicle wherein the tire rests and is affixed to a slidable tray so that when it is necessary to retrieve the spare tire the tray may be released and pulled rearwardly over any cargo in the trunk to a convenient position for removal of the spare tire.

INVENTOR.
JOHN W. SHAMEL
BY Lyon & Lyon
ATTORNEYS

PATENTED FEB 2 1971

3,559,829

INVENTOR.
JOHN W. SHAMEL
BY
Lyon & Lyon
ATTORNEYS

SPARE TIRE HOLDER

BACKGROUND OF THE INVENTION

It has been the practice of automobile manufacturers to place the spare tire of an automobile on the floor of the trunk usually to one side or on a shelf at the rear of the trunk formed to accommodate the gas tank. This presents two problems. First, the tires are usually heavy and must be lifted up out of the trunk which presents great difficulty for women and people who are incapacitated for one reason or another. Secondly, when the trunk has been loaded full of suitcases or other accessories and a flat tire is encountered these things generally make the spare tire inaccessible and must be removed before the spare tire can be reached.

The present invention eliminates these problems by providing a rack to which the spare tire is attached which is above the storage space in the trunk. This rack allows the spare tire to be moved outwardly over any luggage or accessories contained in the trunk at which time the tire can be easily removed and lowered to the ground. Also when the trunk is empty the tire can be moved rearwardly on the slides provided by the invention and hence there is no upward lifting required by the operator.

Therefore, one of the principle objects of the present invention is to provide means for mounting the spare tire which eliminates lifting the spare tire from the trunk of an automobile.

Another object of the present invention is to provide means for mounting a spare tire with which the spare tire is accessible when the trunk of the automobile is full.

A further object of the present invention is to provide means for mounting a spare tire which will increase the useful room in the trunk of the automobile.

These and other objects and advantages of the present invention will become apparent from the following detailed description taken with the accompanying drawings.

Figure 1:
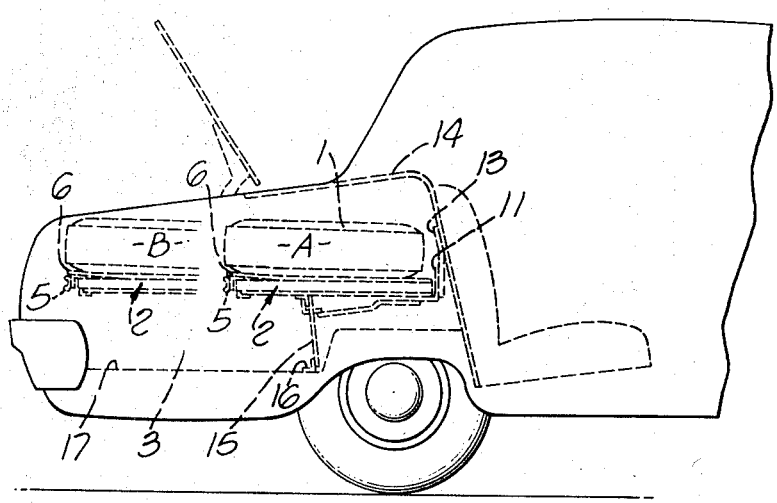
FIG. 1 is a schematic elevation of the rear end of an automobile illustrating the location of the invention in a trunk.
Figure 5:
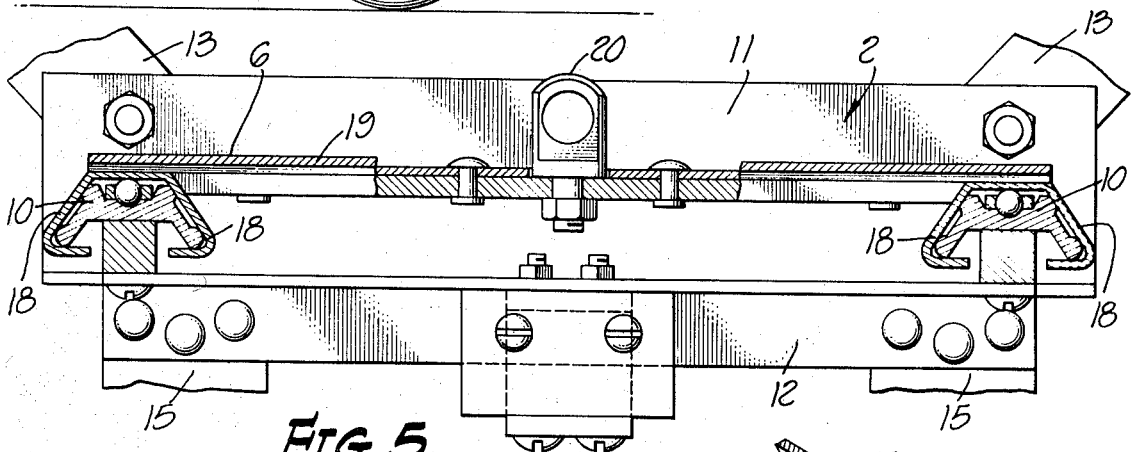
FIG. 5 is a cross-sectional frontal elevation of the invention.

Referring now to the drawings and in particular FIG. 1 which shows the spare tire 1 mounted upon the spare tire holder 2 above the luggage space 3. When it becomes necessary to remove the spare tire nut 5, which may be a wing nut, is released and the spare tire 1 and tire rack 6 are moved rearwardly from the A position to the B position. When the tire is in the B position it may be removed from the tire rack 6 and lowered to the ground.

Figure 2:
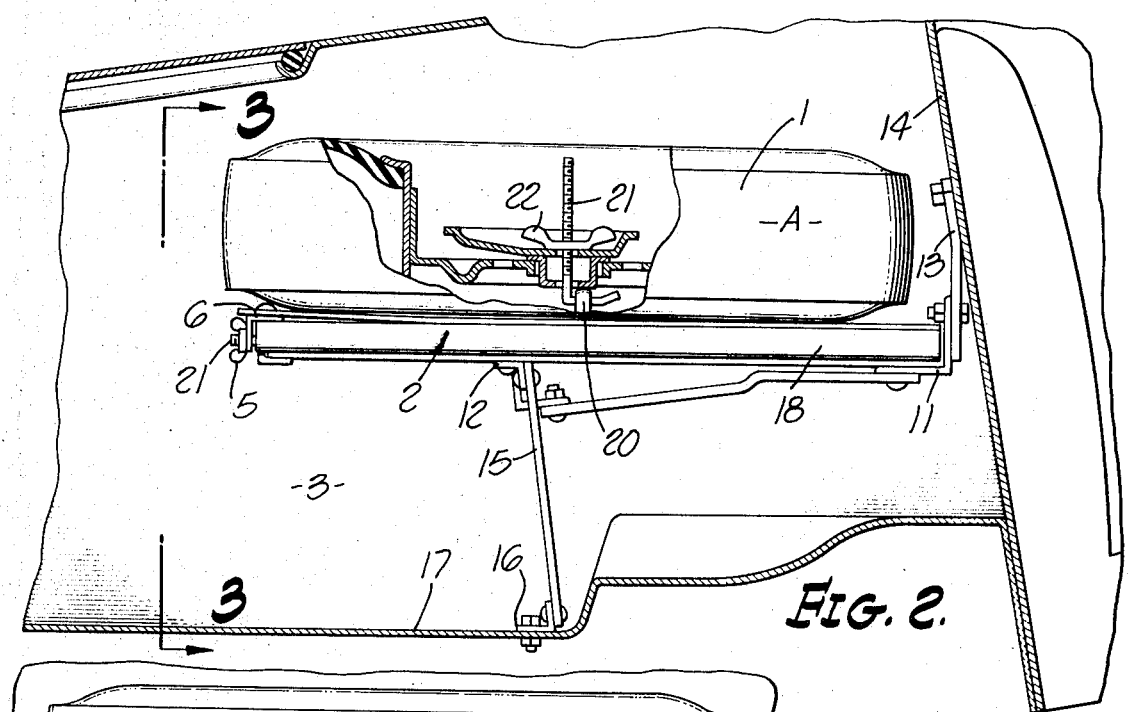
FIG. 2 is a side elevation of the invention with the associating automobile trunk members shown in cross section.
Figure 3:
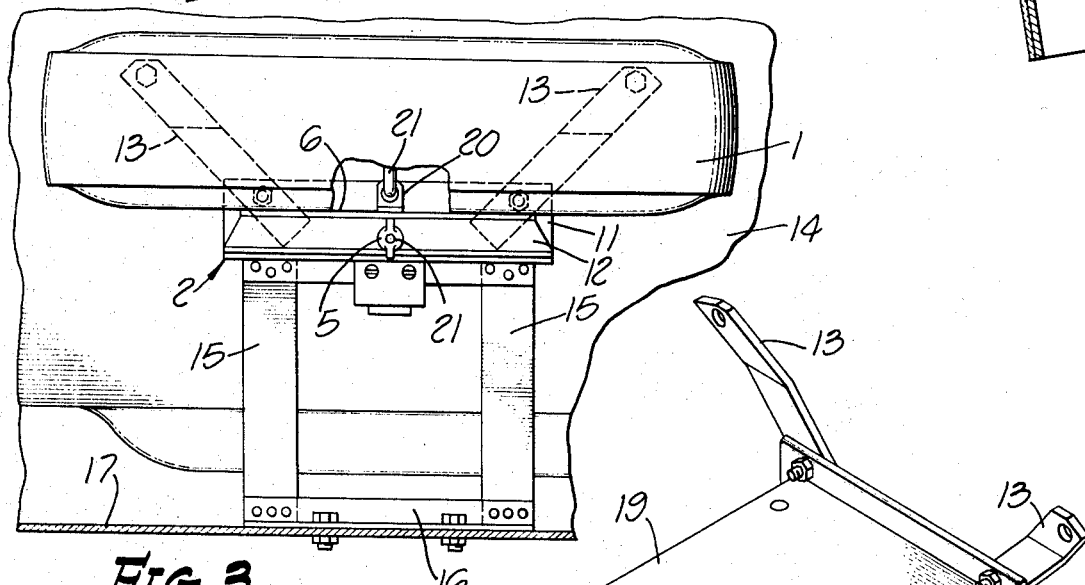
FIG. 3 is an end elevation of the invention taken through lines 3–3 of FIG. 2.
Figure 4:
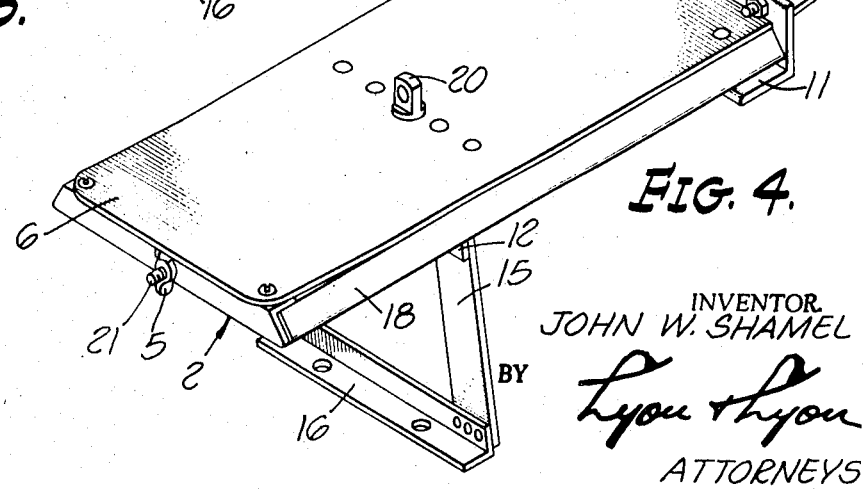
FIG. 4 is an isometric projection of the invention in the retracted position.
Figure 6:
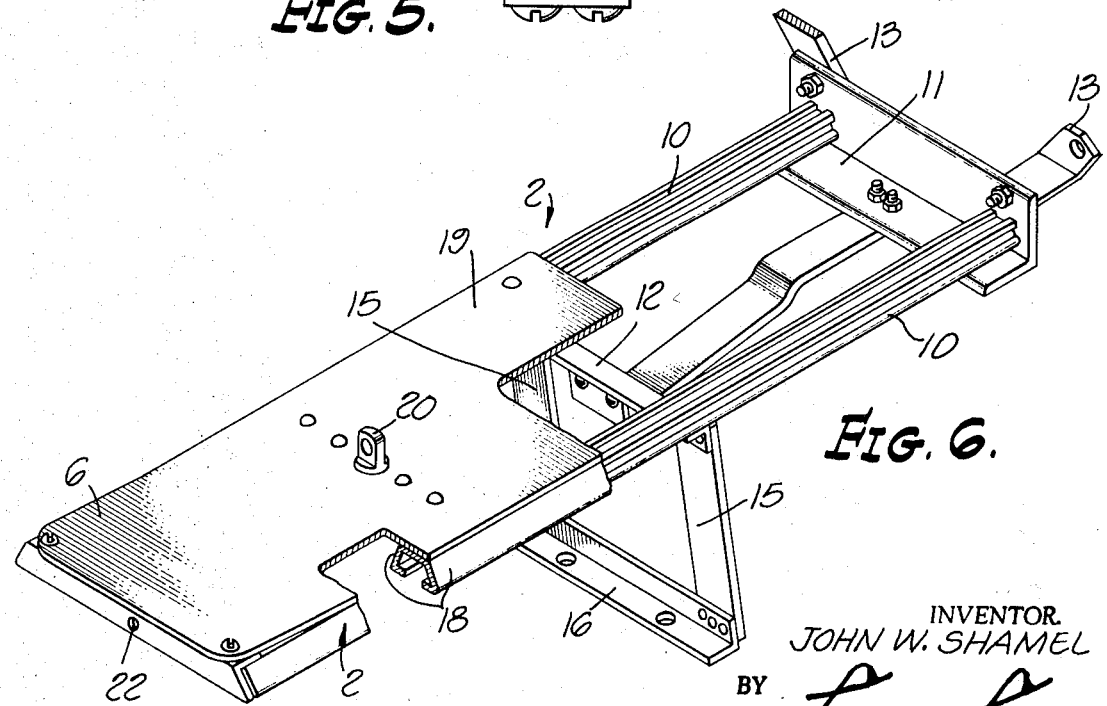
FIG. 6 is an isometric projection of the invention in the extended position.

FIG. 4 and FIG. 6 show the general construction of the entire spare tire holder which comprises parallel side rails 10 which are mounted on a rear cross member 11 and spaced apart by a center cross member 12. The rear cross member 11 is bolted to the rear wall of the trunk 14 which may be done by bolts running through this cross member or through tabs 13 mounted on this cross member. At the other end of the side rails 10 is a second end cross member which supports a threaded bolt 21 which engages a hole 22 in the end of tray 19 so that the tray may be locked in its contracted position by nut 5.

Associated with the center cross member 12 are legs 15 which space the entire assembly above the luggage space 3 in the trunk. Below these legs 15 an additional cross member is provided which is bolted to the floor 17 of the trunk.

The tire rack 6 is slidable mounted upon the side rails 10 by races 18 to which a tray 19 is affixed. To hold the tire in place a lug 20 is mounted on tray 19. This lug 20 is used to engage the L-shaped threaded tire holder 21 and wing nut 22 which is commonly used to hold the spare tire in most vehicles.

Various changes and modifications made be made in carrying out the present invention without departing from the scope and spirit thereof. Insofar as these changes and modifications are within the purview of the amended claims, they are to be considered as part of the invention.

I claim:

1. An expandable spare tire holder comprising:
   a fixed pair of rails;
   a first end member attached to said rails at the rear end of said pair of rails;
   a center cross member attached midway between said rails;
   a tray mounted on said rails with races positioned on each side;
   said races slidably engaging said fixed pair of rails;
   means for securing said spare tire on said tray;
   a second end member attached to said rails at their front end;
   means for locking said tray in a contracted position carried by said second end member; and
   downwardly extending legs members extending from said center cross member adapted to mount on the floor of a vehicle trunk and positioned to raise said tray there above to provide luggage space between said tray and said trunk floor.

2. The expandable spare tire carrier of claim 1 wherein means are provided by said first end members for attaching said tire carrier to the rear partition of said trunk.

3. The apparatus of claim 1 wherein said means for securing a spare tire on said tray comprises:
   an eyelet attached to said tray through which a threaded hook may be secured;
   said threaded hook extending through the center hole of said spare tire rim; and
   said spare tire rim being secured on said tray by a nut and washer threaded on said threaded hook.